United States Patent [19]

Wesenmeyer et al.

[11] 4,175,508
[45] Nov. 27, 1979

[54] METHOD AND APPARATUS TO GENERATE A TRIGGER PULSE WITHIN A TIME RANGE, PARTICULARLY IGNITION PULSES IN INTERNAL COMBUSTION ENGINES

[75] Inventors: Jürgen Wesenmeyer, Nüremberg; Georg Haubner, Berg; Werner Meier, Rednitzhembach, all of Fed. Rep. of Germany

[73] Assignee: Robert Bosch GmbH, Stuttgart, Fed. Rep. of Germany

[21] Appl. No.: 869,616

[22] Filed: Jan. 16, 1978

[30] Foreign Application Priority Data

Jan. 20, 1977 [DE] Fed. Rep. of Germany ....... 2702208

[51] Int. Cl.$^2$ .............................................. F02P 5/04
[52] U.S. Cl. ............................ 123/117 R; 123/108 E; 123/117 D
[58] Field of Search ............. 123/117 R, 148 E, 117 D

[56] References Cited

U.S. PATENT DOCUMENTS

| 3,898,894 | 8/1975 | Aono et al. | 123/148 E |
| 3,916,855 | 11/1975 | Fauser et al. | 123/117 R |
| 3,919,987 | 11/1975 | Haubner et al. | 123/117 D |
| 3,923,021 | 12/1975 | Stark | 123/117 R |
| 3,923,022 | 12/1975 | Scholl | 123/117 R |
| 3,991,730 | 11/1976 | Crall | 123/148 E |
| 4,015,566 | 4/1977 | Wahl | 123/117 R |
| 4,083,347 | 4/1978 | Grather et al. | 123/148 E |

Primary Examiner—Charles J. Myhre
Assistant Examiner—R. A. Nelli
Attorney, Agent, or Firm—Frishauf, Holtz, Goodman & Woodward

[57] ABSTRACT

To permit use of a simple transducer cooperating with a star-wheel, for example the starter gear or other gear on an internal combustion engine and having alternate magnetically responsive projections uniformly distributed around the circumference thereof, a counter is provided to count off a predetermined number of pulses derived from the transducer, the number of pulses being analyzed for their time duration to provide a single output pulse having a time duration corresponding to a predetermined number of teeth passing the transducer. A marker pulse derived from a separate marker element provides a reference. Signals representative of operating parameters of the engine are combined with the pulse having the length corresponding to the predetermined number of pulses, the resulting output being used to provide, upon comparison with a speed-responsive signal, an output, the time occurrence of which will cause triggering of the event, for example generation of a spark for an internal combustion engine.

14 Claims, 3 Drawing Figures

METHOD AND APPARATUS TO GENERATE A TRIGGER PULSE WITHIN A TIME RANGE, PARTICULARLY IGNITION PULSES IN INTERNAL COMBUSTION ENGINES

Reference to related prior patent, assigned to the assignee of the present application: U.S. Pat. No. 3,919,987, HAUBNER et al.

The present invention relates to an apparatus and to a method to trigger an event, and more particularly to a method and apparatus to provide an accurate timing of a pulse used to control the ignition system for an internal combustion engine, so that the occurrence of the pulse will be accurately related to a predetermined angular position of a piston of the engine as a function of speed or other operating parameters of the engine to provide for proper ignition timing.

BACKGROUND AND PRIOR ART

The present invention is an improvement over the system and method described and claimed in U.S. Pat. No. 3,919,987, Haubner et al, assigned to the assignee of the present application. The system of the aforementioned patent provides a predetermined number of pulses within a given angle of rotation of a disk, coupled to a shaft of an internal combustion engine, by locating a predetermined number of magnetic discontinuities, for example teeth, at the circumference of the disk and sensing the passage of these discontinuities, or teeth, by means of a magnetically responsive transducer. This system, while eminently suitable for the purposes for which it was developed, requires a comparatively accurate transducer disk, accurately located on the shaft rotating with the engine. The number of discontinuities, for example teeth, on the disk determines the number of pulses sensed by the transducer.

Adjusting ignition timing by suitable changing of the ignition angle—with respect to angular position of the crankshaft of the engine—has substantial influence on the nature of combustion of the air-fuel mixture when the working or power stroke of the engine commences. Thus, both the power output as well as the nature of the exhaust emission are materially influenced by proper ignition timing. Increasingly severe requirements with respect to detoxification of exhaust gases require increasing accuracy in adjustment of ignition timing at all operating conditions of the engine. Mechanical ignition timing, and change of ignition timing, typically spark advance, while satisfactory in many respects does not, however, meet the requirements for accuracy which are continually demanded.

It is possible to compute the appropriate ignition timing angle by electronic calculation. Electronic arrangements additionally readily permit consideration of various external or ambient operating conditions or parameters, such as engine operating temperature, ambient temperature, loading on the engine, speed, and the like. Also, the actual composition of the exhaust gases, if sensed, can be considered and used as a control parameter to influence ignition timing.

The aforementioned U.S. Pat. No. 3,919,987 utilizes a system in which transduced signals are generated by a disk which has a predetermined number of magnetic discontinuities, located within a predetermined angular range thereof. A transducer generates an output which is a composite formed by a direct voltage with a superimposed alternate voltage. Manufacture of such transducer disks is comparatively expensive and complex; additionally, digital as well as analog signals due to interferences and the like may further modulate the signal derived from the transducer and lead to inaccuracies.

THE INVENTION

It is an object to simplify the basic system described in the aforementioned patent by permitting the use of a transducer disk having uniformly distributed markers or discontinuities thereon, and particularly to permit use of a rotating element which is simple to make or which, preferably, is even already present on the engine or a component thereof. The typical application for this system is in automotive vehicles.

Briefly, the disk or rotating transducer element which, in a preferred form, may be a gear, for example the starter gear of the flywheel of the engine, has a magnetic transducer associated therewith which provides output signals, continuously, as the disk rotates. The magnetic transducer and the disk—or gear, for example—are magnetically associated and form a pulse marker generator. An additional marker, cooperating with a further transducer, is provided, the additional marker being associated with a specific angular position of the disk or, preferably, the gear, so that a reference signal will be provided having a certain timing with respect to a certain angular position of a piston of the engine. A counter is provided which counts in synchronism with rotation of the engine the pulses derived from the transducer responsive to the circumferential gear teeth when the reference marker is sensed. The counter, therefore, permits exact, digital sensing of the pulses during a predetermined angular interval so that a timed pulse can be derived from the counter, as it continues to count, which has a length representative of speed of the engine as well as of angular range of rotation of the disk—typically the gear—during the operation of the engine. This transducer system, in combination with the evaluation circuit which is generally similar to that described in the aforementioned U.S. Pat. No. 3,919,987, Haubner et al, permits precise generation of a trigger pulse, typically an ignition trigger pulse, while using a simple and readily available transducer element in combination with a simple digital ignition timing system. All the advantages of the ignition timing system of the aforementioned Haubner et al U.S. Pat. No. 3,919,987 are retained, for example the possibility to use a speed-ignition advance characteristic which is steep, which changes suddenly at certain speed ranges and the like, and which permits introduction of ambient operation and operating parameters into the system to modify the ignition angle advance while, simultaneously, utilizing existing apparatus and being easier and cheaper to construct.

Drawings, illustrating an example:

Figure 1:
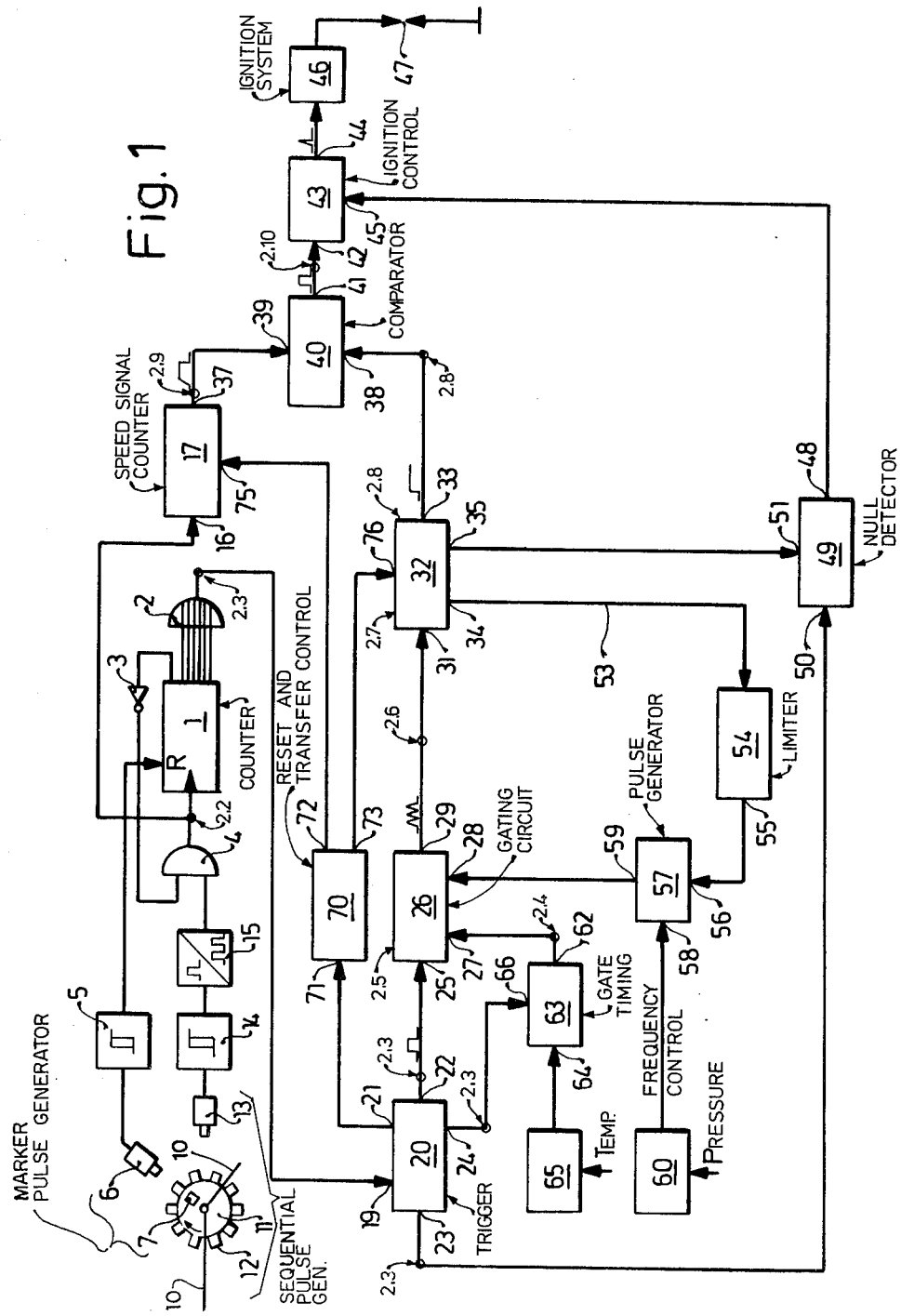
FIG. 1 is a general schematic diagram of the system.

The crankshaft 10 of an internal combustion (IC) engine, not shown, is connected to a counter disk 11. The counter disk 11 is formed with magnetic discontinuities at its circumference; typically, disk 11 is a star-wheel which has teeth 12, cooperating with a transducer 13. The disk 11 with the teeth 12 may, for example, be the flywheel-and-starter gear of an automotive-type internal combustion engine; transducer 13 is located in magnetically coupled relation to the teeth 12 and provides output pulses to a wave-shaping circuit 14 which, typically, is a Schmitt trigger. The outputs from wave shaper 14 are connected to a pulse multiplier 15 which provides a plurality of output pulses during the time of any one pulse from circuit 14, so that the system can be more sensitive. A marker 7 is located on the disk 11—or on an element rotating in synchronism therewith, the marker 7 cooperating with a transducer 6 which provides a reference marker pulse when the disk 11, typically the flywheel of the engine, has a predetermined reference position associated with a predetermined angular position of a piston of the engine. More than one reference marker 7 may be located on the disk, depending on the number of cylinders of the engine.

In accordance with the present invention, a digital 8 digit counter 1 is provided having seven binary outputs. The six outputs associated with the lowest binary numbers are all connected to an OR-gate 2. The output associated with the highest binary number is connected to an inverter 3, the output of which is connected to an enabling input of an AND-gate 4. The output of the AND-gate 14 is connected to the clock or count input of the counter 1. The other input of AND-gate 4 receives output pulses from the multiplier 15. The number of the count outputs from counter 1 can be any selected number and will depend, to some extent, on the multiplication factor of stage 15. Rather than selecting the last numbered output for connection to the inverter 3, a logic connection of outputs associated with a predetermined number can be used for connection to the inverter 3 which, in turn, is connected to AND-gate 4 to commence counting by the counter. The counter is reset by connection of the count input terminal R thereof to a wave shaper 5, which may be similar to wave shaper 14 and which, in turn, is connected to the reference marker transducer 6.

The pulses derived from transducer 13, and multiplied in multiplier 15, and occurring during the counting range of the counter 1, up to the last number, are applied to a speed signal counter 17 which correspond to counter 17 of the aforementioned U.S. patents. Elements which are similar and have similar function in the aforementioned U.S. patent to elements used in the present invention have been given the same reference numerals, and have been similarly labeled.

The number of pulses counted by counter 1 and passed by OR-gate 2 are applied to an input 19 of a pulse trigger stage 20, which has outputs 21, 22, 23 and 24. Output 22 is connected to an input 25 of a gating circuit 26. Gating circuit 26 has an output 29 and additional control inputs 27, 28. Output 29 is connected to the count input 31 of a count-and-store stage 32. The output 33 of the count-and-store stage, which preferably is a counter with a memory connected thereto to which a certain count output in the counter can be transferred, similarly to a holding circuit, is taken from output terminal 33 and connected to the input 38 of a comparator 40, the other input 39 of which is connected to the output 37 of the speed signal counter 17. Output 41 of comparator 40 is connected to the input 42 of a trigger stage 43, forming an ignition control circuit which, in turn, has its output 44 connected to the ignition system 46. The ignition system 46 may be any known ignition system. As shown, and for simplicity, it is connected to a single spark plug 47 although, as usual, it can be connected to a multiplicity of spark plugs through a distributor or other suitable distribution circuit. The second input 45 of the ignition control system is connected to the output 48 of a null detector stage 49, the input 50 of which is connected to an output 23 of the trigger 20. The null detector 49 has a further input 51 connected to an output of the count-and-store stage 32. A further output 34 of the count-and-store stage 32 is connected through line 53 to a limited stage 54, the output 55 of which is connected to an input 56 of a pulse generator 57, providing a frequency pulse train. A further input 58 of of the frequency generator 57 is connected to a pressure transducer 60 which, for example, provides output frequency control signals to control the frequency of pulse generator 59 in dependence on pressure or, rather, vacuum of the intake manifold of the engine. An output 59 from the pulse generator is connected to input 28 of the gating circuit or stage 26. A temperature transducer 65 is connected to an input 64 of a gate timing circuit 63 which has a gating input 66 connected to an output 24 of the pulse trigger stage 20. The output 62 of gate and timing stage 63 is connected to input 27 of the gating circuit 26. Transducer 65 senses a further operating parameter which is important to proper ignition timing, for example engine temperature.

A reset and transfer control stage 70 forming, essentially, a reset circuit, has its input 71 connected to output 21 of the pulse trigger stage 20. It has two outputs 72, 73 connected, respectively, to an input 75 of the speed signal counter 17 and the reset and hold or store input 76 of the count-and-store stage 32.

Figure 2:
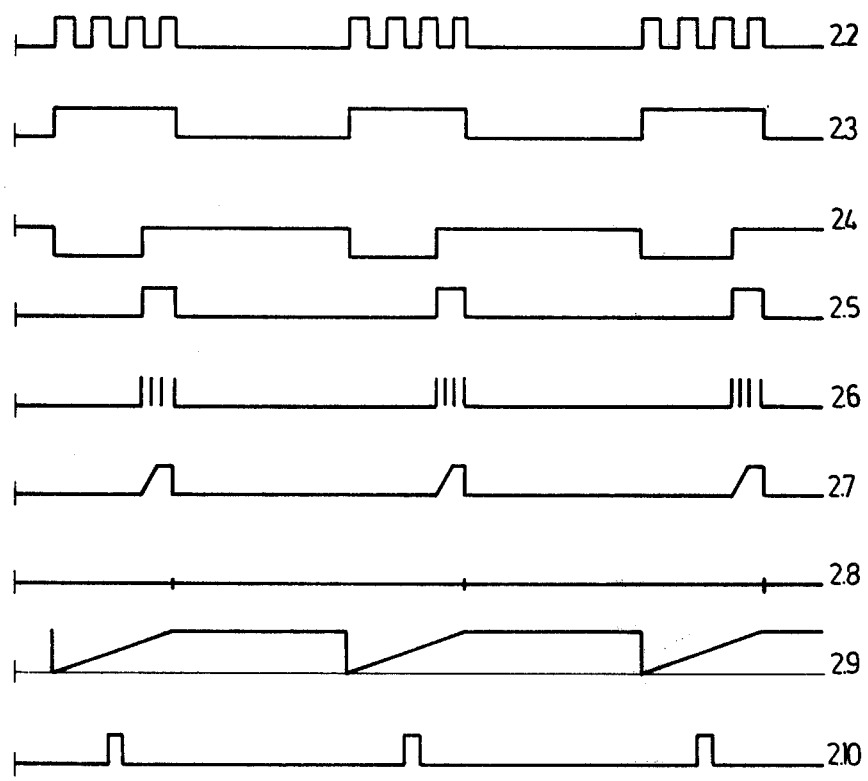
FIG. 2 is a series of timing diagrams illustrating the operation of the system.
Figure 3:
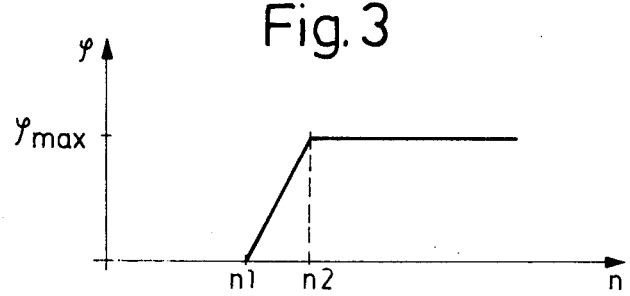
FIG. 3 is a speed (abscissa) vs. crankshaft angle, or ignition angle (ordinate) graph, and illustrating one possible ignition advance characteristic.

Operation, with reference to FIGS. 2 and 3: The pulse and timing diagrams of FIG. 2 are numbered; the points of the circuit of FIG. 1 where the corresponding signals arise have been similarly numbered. The pulse diagrams are drawn to the same time scale.

The output from AND-gate 4 is shown in graph 2.2 of FIG. 2. The signal is generated in that the counter 1 is reset by a signal generated by the reference marker - transducer combination 7, 6, so that the output of the inverter 3 will have a 1-signal appear thereon. The pulse transducer 13, in combination with the points or gear teeth 12 of disk or gear 11 can then provide pulses which are transmitted through the AND-gate 4 to the counter 1. The counting steps in the counter 1 continue until, for example, the seventh or highest output of the counter 1 will have a signal appear thereat which is transmitted over the inverter 3 to the AND-gate 4, thus blocking the AND-gate for the transmission of further count pulses. The signals summed during the time that the AND-gate 4 was conductive, corresponds to a predetermined number of markers or projections 12. Three cycles are shown in graph 2.2 of FIG. 2. During any one such counting cycle, the output of the OR-gate 2 will have a continuous 1-signal thereon, as seen in the graph 2.3 since, at all times, at least one of the outputs of the counter 1 will have a 1-signal appear thereat. The pulse multiplier stage 15 is provided to permit a sufficient count numbered to be entered in the counter 1 although the actual number of markers 12 may be low. Increasing the number of digits through which the counter 1 has to count increases the accuracy of the system. Thus, an already existing star-wheel, such as the starter gear of an automotive internal combustion engine can be used without loss of accuracy.

The trigger stage 20 transmits the output signal from OR-gate 2 to the output 22 thereof; it acts, essentially, as a wave-shaping stage. The length of the pulse train shown in graph 2.2 with the constant number of pulses, as well as the output signal from the pulse trigger stage 20 shown in graph 2.3 depends on engine speed. The gate timing stage 63 generates a d-c pulse 2.4 of a length which is determined by temperature sensor 65. The pulse 2.4 has constant length for any constant temperature, and is applied to the gating circuit 26 by input 27. The pulse 2.4 is negative; it begins at the commencement of the signal shown in graph 2.3. The two signals shown in graph 2.3 and 2.4 are algebraically added in the gating circuit 26 to result in a gating signal shown in graph 2.5; during that gating signal or, respectively, during the time of occurrence of the gating signal, a train of pulses derived from pulse generator 57 can be connected through to the count input 31 of the count-and-store circuit 32. The signal at the count input 31 is shown in graph 2.6. The count-and-store circuit counts the signals applied to input 31 until it receives a pulse from the reset and transfer control stage 70. At that point, the counting part of the count-and-store circuit 32 transfers the count into a storage stage, and a counting portion thereof is reset. The storage portion or memory is so arranged that any prior count is up-dated by the new one, that is, a previously stored count is superseded by the count transferred to the memory or storage section upon receiving a pulse from the reset and transfer control circuit 70. The pulse train shown in graph 2.6 will have a constant or unvarying number of pulses if the operation or operating parameters of the system do not change. The memory or storage portion of the count-and-store stage will contain, therefore, always the maximum count number of the preceding counting cycle which appeared at the input 31 of stage 32.

The stored count of the preceding cycle is applied from output 33 of stage 32 to one comparison input terminal 38 of comparator 40. The counter 17 sums the pulses being passed through the output of AND-gate 4. When the count number in counter 17 corresponds to the count appearing at the output 33 of count-and-store circuit 32, then the comparator 40 will provide a pulse at its output 41, as seen in graph 2.10 which triggers the ignition control stage 43 which, in turn, triggers the ignition system 46 to initiate an ignition event, that is, arc-over of spark plug 47.

The pulse length of the output signal 2.4 of the gate timing stage 63 and the frequency of the frequency generator 57 can be changed in dependence on operating parameters. As illustrated in FIG. 1, a temperature sensor 65 connected to input 64 of th gate timing circuit 63 thus provides temperature control with respect to the gating time of gating circuit 26; a pressure transducer 60 provides frequency control of pulse generator 57, so that pressure or, rather, vacuum in the intake manifold representative of loading on the engine can likewise be used as an additional operating parameter to influence ignition timing. Other parameters and suitably sensed can be connected into the circuit to provide additional overriding controls and change ignition timing in accordance with sensed parameters.

The signal 2.4 (FIG. 2) has a shorter duration than the signal 2.3. The pulse width of the signal shown in graph 2.3 decreases as the speed of the engine increases. The number of outputs from counter 1, or the multiplication factor of stage 15, or the signal from gate timing stage 63 can be so arranged that at maximum speed of the engine, under certain conditions, both pulses of graphs 2.3 and 2.4 are of equal time duration. This would prevent passage of any pulses through the gating circuit from the frequency pulse generator 57 to the count input 31 of the count-and-store circuit 57. Thus, the circuit 32 will read zero. It is necessary, however, to provide ignition pulses also under high-speed operation of the engine. Null detector 49 recognizes if the count in counter 32 is zero. If null detector 49 makes the determination that the count in stage 32 is zero, the null detector 49 connects the signal of graph 2.3 and derived from stage 20 directly to the ignition control stage 43. This signal is so timed that the maximum ignition advance angle is commanded.

As the speed decreases from maximum or a certain high-speed operation of the engine, the length of the pulse of graph 2.3 increases and, consequently, the number of pulses seen in graph 2.6 will increase, thus increasing the count number in circuit 32. Consequently, more pulses from transducer 13 are needed to provide for comparison, which results in an output pulse of graph 2.10 at a later time, that is, comparison of the signals of graphs 2.8 and 2.9 will result in a later output pulse of graph 2.10. The ignition advance angle thus is decreased, and the ignition will take place at a smaller angular advance with respect to top dead center (TDC) position of the respective piston.

The maximum count state of counter 17 is determined by the number of teeth 10 and the multiplication factor of multiplying stage 15; it is, also, dependent on the maximum count state of the counter 1. The maximum count stored in circuit 32 depends on the length of the signal of graph 2.5, that is, the number of pulses from pulse generator 57 which reach the count input terminal 31 of stage 32 during the duration of the gating signal of graph 2.5. A limiter stage 54 is provided which limits the maximum count stage of the counter 32 to the number of pulses which can be counted in counter 17. An output from limiter 57 thus interrupts the generation of pulses from stage 57 if the count number in counter 32 has reached this maximum value.

The counting diagram or graph 2.7 shows the count value in the counting portion of the count-and-store circuit 32. Graph 2.8 shows the storage content of the counter 32; graph 2.9 the numerical value of the counter 17; and graph 2.10 shows the output pulse of the comparator 40—all with respect to time.

The reset and transfer control stage 70 is provided to reset counter 17 as well as the count portion of circuit 32 and to control transfer of the count number from the count portion of circuit 32 into the storage portion thereof.

The adjustment range of the circuit depends on the highest count state which can be counted in counter 1, and on the density or number per circumferential length unit of the teeth 12 on the starwheel or gear 11, as well as on the multiplication factor of the pulse multiplier 15. The density of the projections or gear teeth 12 will determine the accuracy of generation of the output trigger pulse.

The timing adjustment or spark advance characteristic is shown in FIG. 3. The present invention is particularly suitable for a characteristic of the type shown in FIG. 3. Until the speed n1 has been reached, the signal of graph 2.3 is substantially longer than the signal of graph 2.4. Consequently, the gating time of gating circuit 26 is long and the count input 31 of the count-and-store circuit 32 will have the maximum pulse number applied thereto. Throughout this maximum number, the advance angle stays constant, even though the speed may rise. As the speed increases therebeyond, the length of the signal 2.3 continues to decrease and hence the length of the signal 2.5 will become shorter. The number of pulses transmitted to circuit 32 will decrease. As a result, the ignition system 46 is controlled to advance the spark proportionately to speed of the engine, due to the comparison of the lesser number of pulses at terminal 38 with the speed signal pulses at terminal 39 applied to the comparator 40.

The speed of the engine will reach an upper limiting value n2, which corresponds to maximum ignition advance angle. At this point, the null detector 49 will take over by connecting the rising flank of the signal of graph 23. directly to the ignition control circuit 49 to trigger the ignition system 46 coincident with the rising flank of the signal 2.3, that is, the first one of the pulses being sensed after resetting of the counter 1. Within the speed ranges n1, n2, the digital change in ignition timing is fully effective.

The ignition angle can be changed over substantial angular ranges within a very narrow speed range. This is a substantial advantage with respect to known systems of electronic ignition timimg. Additionally, the system has practically no hysteresis, and permits accurate setting of the ignition instant within the adjustment range.

Various types of systems may be used for the transducer 13 in combination with the starwheel 11 and the projection 12 thereof. It is only necessary to provide a system which has output signals which can be suitably processed by a wave-shaping circuit, for example the Schmitt trigger 14. The fixed transducer 13 may, for example, be an inductive transducer, a magnetic plate or disk, the system may be entirely photoelectric, or other transducer systems may be used.

The various stages of the circuit can be constructed of commercially available circuit elements or integrated circuits. For example, the gate timing circuit 63 can be a commercial monostable multivibrator circuit; frequency pulse generator 57 can be an astable multivibrator.

The starwheel 11 need not be directly connected to the crankshaft of the engine but can be driven by another shaft, coupled to the crankshaft, for example the cam shaft of an internal combustion engine. It is also possible to utilize a shaft on which a rotating magnet is provided; such arrangements are particularly suitable for magneto-type ignition systems.

The entire circuit lends itself to integration as a single integrated circuit element if the number of required circuits warrants the expense of preparing the integrated circuit.

Various changes and modifications may be made within the scope of the inventive concept.

We claim:

1. System to trigger an ignition pulse to determine the ignition instant in an internal combustion engine with respect to a reference position of the crankshaft of a piston thereof comprising a marker pulse generator (6, 7) providing a marker pulse when the piston has reached a predetermined position;

a sequential pusle generator (11, 12, 13) providing a continuously occurring plurality of pulses during operation of the apparatus, a predetermined number of said pulses, upon occurrence of said marker pulse, forming a pulse train;

count and store circuit (32);

condition signal generating means (60, 65) generating at least one engine operating signal representative of an operating or operation condition of the engine;

a pulse generator means (57) generating a sequence of pulses;

a gating circuit (26) connected to the condition signal generating means (60,65) and having the sequential pulses from the pulse generating means (57) applied thereto, and applying the pulses from said frequency generating means during the occurrence of said pulse train to the count and store circuit (32);

said count and store circuit alternately counting and storing the pulses applied by said gating circuit; and a comparator (40) comparing the pulses stored in the memory of the count and store circuit (32) and the pulses derived from the sequential pulse generator and forming said pulse train, and providing said ignition signal when a predetermined relation between the pulses applied to the comparator exists, wherein, in accordance with the invention, to generate said predetermined number of pulses forming said pulse train a counter means (1) is provided having said plurality of pulses from said sequential pulse generator (11, 12, 13) applied thereto, the counter being further connected to said marker pulse generator to start counting said pulses from the sequential pulse generator (11, 12, 13) upon occurrence of the marker pulse; and decode means (2, 3, 4) connected to a predetermined stage of the counter means (1) and deriving a pulse having a time length representative of rotation of the shaft of the engine through a predetermined angular range, including gating means (2) connected to at least one predetermined count output stage of the counter means (1) whereby stepping of the counter means in synchronism with the pulses and gating a counter means signal at a predetermined count stage will provide a time interval signal having a timing duration representative of said angular range of rotation.

2. System according to claim 1, wherein the decode means includes a gate (4) connected to the count input of said counter means (1);

the sequential pulse generator (11, 12, 13) being connected to another input of said gate;

the marker pulse generator (6, 7) being connected to the reset input of said counter means (1);

said decode means (2, 3, 4) and said gate (4) being connected to inhibit counting of the counter means when the counter means has reached a predetermined count number; and said gating means includes an output stage (2) connected to said predetermined count output stage which is associated with a count number of said counter means smaller than said predetermined count number.

3. System according to claim 2, wherein said output gate (2) comprises an OR-gate connected to all count output stages representative of said smaller number.

4. System according to claim 2, further including waveshaping stages (5, 14) being connected to the respective pulse generators (11, 6, 7; 12, 13).

5. System according to claim 2, further including a pulse multiplying stage (15) connected between the sequential pulse generator (11, 12, 13) and the counter means (1) to cause said counter means to count at a counting rate which is a multiple of the pulse rate derived by said sequential pulse generator.

6. System according to claim 2, further including a null detector (49) connected to said count and store circuit (32) and detecting if the count state in said count and store circuit is zero or null; and
  means (20, 23, 50, 48, 45) including a pulse trigger stage (20) connected to said counter means and applying a signal representative of a predetermined count state of said counter means directly to said ignition system to provide an ignition trigger signal thereto.

7. System according to claim 2, wherein one of said condition signal generating means (65) generates a signal (2.4) in form of a square wave, said signal being applied to said combining means;
  the decode means (2, 3, 4) generates a signal (2.3) in form of a square wave, said respective square wave signals having opposite polarity, and said gating circuit (26) algebraically adding said signals to provide a resultant output signal representative of the difference of time of occurrence of said signals.

8. System according to claim 2, wherein at least one (60) of said condition signal generating means is connected to and controls the frequency of said pulse generating means (57);
  the decode means (2, 3, 4) generates a signal (2.3) in form of a square wave, said gating circuit (26) passing the signals from said pulse generating means, at the frequency commanded by said condition signal generating means during the duration of said square wave signal derived from the decode means.

9. System according to claim 8, further including a limiter (54) connected to the pulse generating means (57) and limiting the number of pulses generated by the pulse generating means and being applied to said gating circuit (26) to prevent application of a number of pulses from the gating circuit (26) to the count and store circuit (32) in excess of the pulse counting and storage capability of said count and store circuit (32).

10. System according to claim 1, wherein the marker pulse generator includes a marker element (7) located on a rotating component (11) coupled to the crankshaft of the engine, and a fixed transducer (6) responsive to the passage of the marker element past said transducer.

11. System according to claim 10, wherein, for a multi-cylinder engine, a plurality of marker elements are provided on said rotating element, cooperating with said fixed transducer (6).

12. System according to claim 1, wherein the circuit components forming said system comprise an integrated circuit.

13. Method to trigger an ignition pulse for an internal combustion engine in dependence on the angular position of a piston of the engine with respect to a reference position thereof
  comprising the steps of
  generating a marker pulse when a piston of the engine has reached a predetermined position;
  generating a sequence of pulses during operation of the engine, a predetermined number of said pulses, upon occurrence of the marker pulse, forming a pulse train;
  generating an interval pulse (2.3) representative of a second predetermined number of pulses which are less than said number of pulses forming the pulse train;
  generating control signals representative of operating parameters of the engine;
  modifying said interval pulse (2.3) by said generated control signals and generating a derived interval pulse (2.6); and
  comparing the time duration of said derived interval pulse and the duration of said pulse train (2.9) to generate an ignition trigger signal (2.10),
  wherein, in accordance with the invention, the step of generating said pulse train (2.2) and said interval pulse (2.3) comprises the steps of
  counting a predetermined number of pulses from said sequential pulse generator (11, 12, 13) after occurrence of the marker pulse;
  decoding a lesser number of count digits during counting of said plurality of pulses, and determining the time duration of counting of said lesser number of pulses,
  whereby generation of the marker pulse will initiate a counting sequence common to the determination of said pulse train and to the duration of said interval pulse (2.3), and both the pulse train and the interval pulse will be determined by digital counting sequences under control of said sequential pulse generator.

14. Method according to claim 13, including the step of frequency multiplying the pulses from the sequential pulse generator before carrying out said counting step.

* * * * *